United States Patent
Wopshall, Jr.

[11] Patent Number: 5,980,417
[45] Date of Patent: Nov. 9, 1999

[54] DIFFERENTIAL CASE INSERT

[75] Inventor: Albert H. Wopshall, Jr., Fort Wayne, Ind.

[73] Assignee: Dana Corporation, Toledo, Ohio

[21] Appl. No.: 09/130,127

[22] Filed: Aug. 6, 1998

[51] Int. Cl.$^6$ ................................................. F16H 48/08
[52] U.S. Cl. ................................................................ 475/230
[58] Field of Search ........................... 475/230; 384/275

[56] References Cited

U.S. PATENT DOCUMENTS

| | | |
|---|---|---|
| 741,931 | 10/1903 | Sandell . |
| 1,097,653 | 5/1914 | Lindsay ...................................... 475/230 |
| 1,158,439 | 11/1915 | Bunting . |
| 1,445,865 | 2/1923 | Alden . |
| 3,872,741 | 3/1975 | Berchtold . |
| 4,289,047 | 9/1981 | Hopkins . |
| 5,131,894 | 7/1992 | Hilker . |
| 5,281,034 | 1/1994 | Hertlein .................................. 384/275 |
| 5,545,102 | 8/1996 | Burgman . |
| 5,896,775 | 4/1999 | Southcott ................................ 475/230 |
| 5,897,452 | 4/1999 | Schreier et al. ........................ 475/230 |

*Primary Examiner*—Dirk Wright
*Attorney, Agent, or Firm*—Oldham & Oldham Co., L.P.A.

[57] ABSTRACT

A case-driven differential for a vehicle has a pair of inserts, one of which is used in each of a pair of opposing bores in the differential case. These bores in which the inserts are used receive the ends of the pinion shaft. The inserts are plug-like elements which are press fitted into the bores. The inserts are preferably formed from powdered metal in a net forming technique. Such an insert will be harder and more wear-resistant than the metal used in the differential case and will possess additional porosity for providing and retaining lubricant in critical wear areas. The end of the insert which projects into the interior of the case may be used to provide a flat thrust surface against which one of the pinion mates on the pinion shaft may bear.

13 Claims, 2 Drawing Sheets

DIFFERENTIAL CASE INSERT

The present invention relates to an insert for a differential case. More particularly, the invention relates to such an insert which provides a complementary thrust surface for at least one pinion mate. Even more particularly, the insert is press fitted into the case and receives an end of a pinion shaft on which the pinion mate is seated.

BACKGROUND OF THE INVENTION

Differentials of the type to which the present invention relates are commonly used in vehicles to transmit torque from a drive shaft to a pair of driven shafts. In many of these differentials, a C-washer axle shaft retention system is used to hold the driven shafts in the differential case, and it is common to provide a slip fit between the pinion shaft (also referred to as the cross shaft) and the differential case. While this construction allows for ease of assembly and disassembly, it also can lead to unexpectedly high wear of the case, particularly in a critical area where the ends of the pinion shaft are received and held in the case. It is therefore an advantage of the present invention to reinforce this critical wear area in the differential case, and, additionally, to provide the capability of replacing the area subject to the greatest amount of wear without requiring replacement of the entire differential case.

SUMMARY OF THE INVENTION

This advantage of the present invention is provided by an insert for a differential case of a vehicle differential. In addition to the differential case, the differential has a pinion shaft having its ends fitted into a pair of opposing bores in the differential case, a pair of pinion mates mounted on the pinion shaft, a pair of opposed side gears mounted inside the case in mesh with the pair of pinion mates and a pair of shafts extending along an axis with an end of each of the shafts connected to rotate with one of the side gears. The improvement to the differential is achieved by the insert, which is positioned in an interposing fashion between one of the ends of the pinion shaft and the one of the opposing bores in which the pinion shaft end is fitted.

BRIEF DESCRIPTION OF THE DRAWINGS

A better understanding of the present invention will be had when reference is made to the accompanying drawings, wherein identical parts are identified by identical reference numerals and wherein.

DETAILED DESCRIPTION OF THE PREFERRED EMBODIMENT

Figure 1:
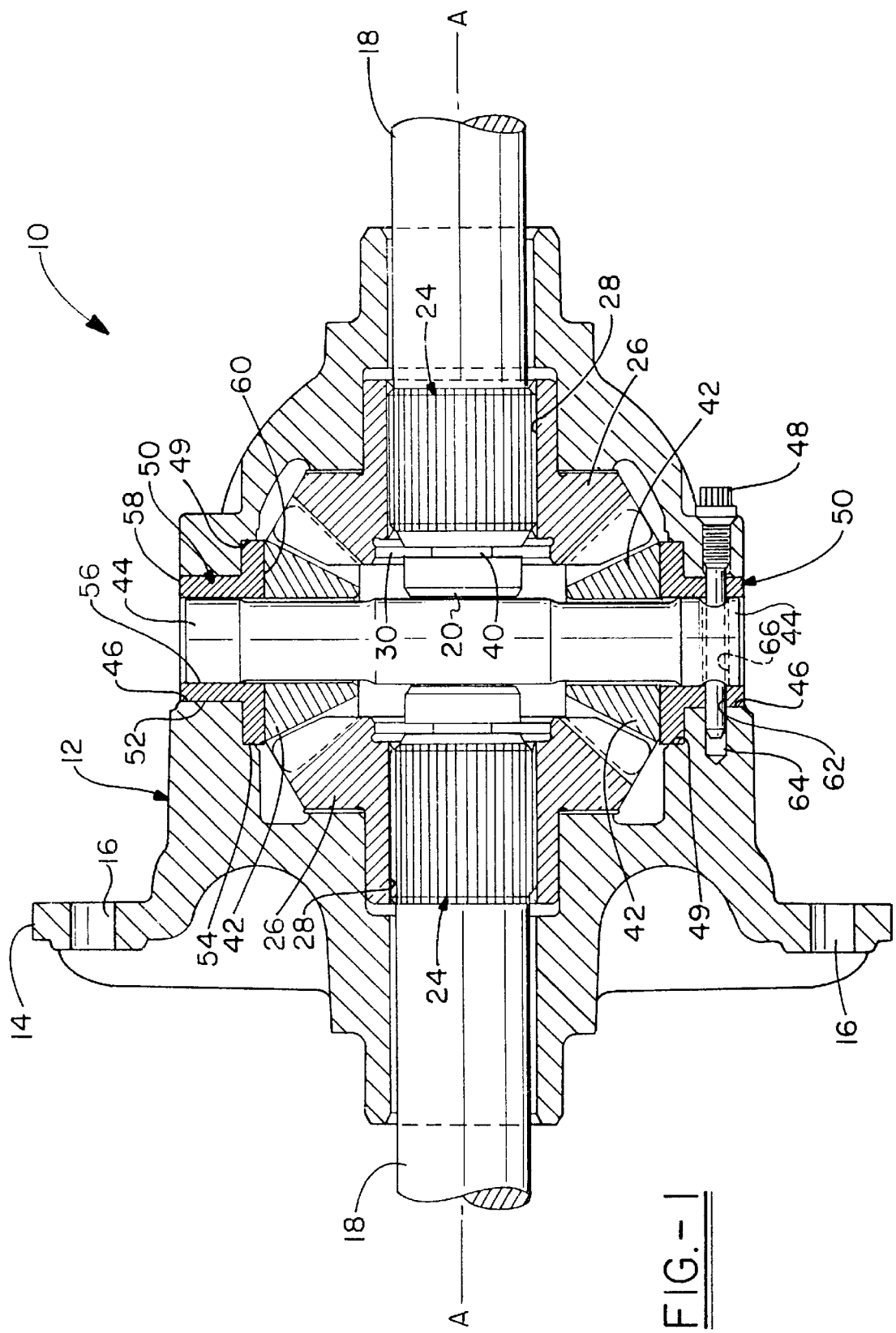
FIG. 1 shows a sectional view of a differential incorporating the novel features of the present invention.

A differential 10 incorporating the present invention is shown in sectional view in FIG. 1. The differential 10 includes a case 12, having a flange 14 with a plurality of bores 16, through which a ring gear (not shown) may be affixed so that it extends radially outwardly from the case. Such a ring gear is meshed with a drive pinion (not shown) on an end of a drive shaft (not shown) from which drive torque is transmitted to the case, as is well known in this art.

The case 12 is free to rotate on an axis A generally defined by the axis of a pair of coaxial driven shafts 18. Each of the driven shafts 18 has an inner end 20 which extends into the generally hollow interior of the differential case 12. Splines 24 formed on the outer surface of each driven shaft 18 near the inner end 20 thereof allow the driven shaft to be rotationally fixed to one of a pair of opposed side gears 26 when these splines are inserted through a central bore 28 in each of the side gears. In preferred embodiments of the invention as shown in the figures, an inner face of each of the side gears 26 has a counter bore 30. This counter bore 30 provides a site for a shaft retention system 34 to restrain the inner end 20 of the shaft from axial movement.

Figure 2:
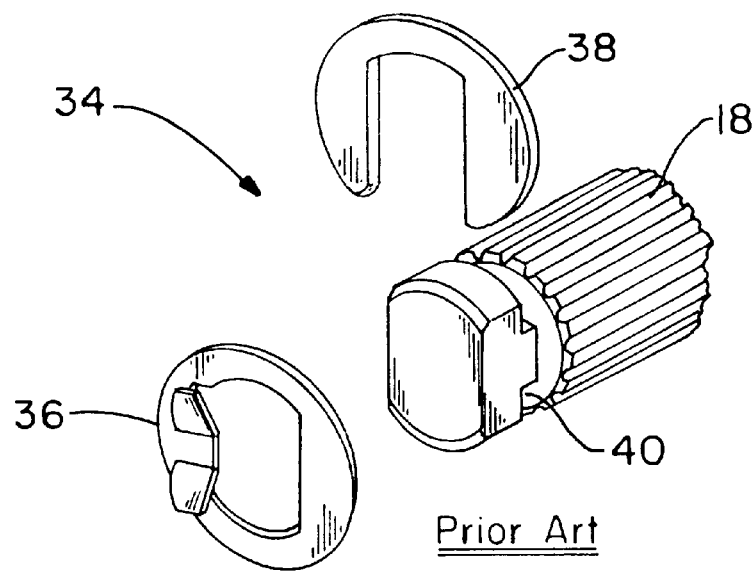
FIG. 2 shows an isolated perspective view of a shaft retention system known in the prior art with which the present invention is useful.

Particular details of a shaft retention system 34 useful in this invention are further disclosed in FIG. 2, which is taken directly from U.S. Pat. No. 5,131,894. While not required for the operation of the present invention, understanding of the shaft retention system 34 assists in the understanding of the present invention. Specifically, a spring washer 36 is placed onto the inner end 20 and moved axially toward the side gear, which rests on the splined portion 24 of the shaft 18. Clip 38 is also placed onto the inner end 20, spaced toward the inner end from spring washer 36. Preferably, there is a groove 40 on shaft 18 which is sufficiently deep to receive the spring washer 36 and the clip 38. This depth of groove 40 is approximately the same as the depth of counter bore 30 in the side gear 26. It will be noted that the shaft retention system 34 prevents axial movement of the shaft 18 in a direction outwardly from the case 12.

Referring back to FIG. 1, the side gears 26 mesh with a pair of pinion mates 42 (also referred to as bevel drive gears), each of which is able to rotate freely on a pinion shaft or cross shaft 44, the ends of which are to be fixed to the differential case 12, as will be described. The pinion mates 42 which will be commonly used are bevel gears with the end having the larger diameter positioned so that it faces the differential case. The differential case 12 is not a closed body, but will customarily be provided with at least one access window (not shown) through which the generally hollow interior may be accessed. Once the side gears 26 and pinion mates 42 are positioned inside the case 12, the shafts 18 may be axially retained, using a shaft retention system such as that shown by reference numeral 34. After the shafts 18 are retained, the cross shaft 44 may be inserted through a pair of opposing bores 46 in the differential case 12 and through central bores in the pinion mates 42. Because of the necessarily loose fit of cross shaft 44 in bores 46 to allow this assembly technique, the cross shaft will typically be retained in the case 12 by a screw 48 or the like passing transversely through the shaft 44. The cross shaft 44 serves the further function of preventing axial movement of the shaft 18 in a direction inwardly in the case 12. In combination with the shaft retention system 34, the cross shaft 44 effectively fixes each shaft 18 axially relative to the side gear 26 and to the case 12.

Although the bores 46 which would be used in the prior art techniques would be slightly larger in diameter than the outside diameter of the cross shaft 44, the bores 46 which are used in the present invention are considerably larger in diameter. Additionally, the bores 46 have a counter bore 49 from the inside, the counter bore providing a seat for placement of an insert 50 therein.

Figure 3:
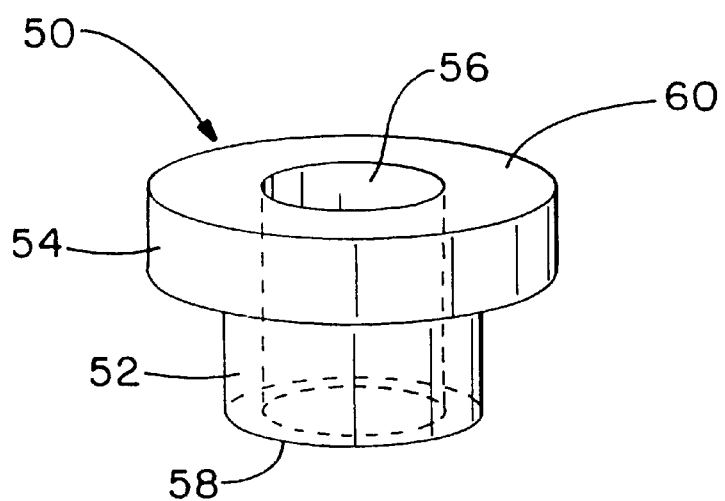
FIG. 3 shows an isolated perspective view of the differential case insert of the present invention.

Differential case insert 50 is shown in isolated perspective view in FIG. 3. The insert 50 is essentially a short cylindrical plug. It has first and second cylindrical portions 52, 54, with the outside diameter of the second cylindrical portion 54 being larger than the outside diameter of first cylindrical portion 52. An axial bore 56 passes through the insert 50. Axial bore 56 has a diameter slightly larger than the outside diameter of the cross shaft 44. The outside diameters of first and second cylindrical portions 52, 54 are sized to provide a slight interference fit with bores 46, 49, respectively. In the preferred embodiments, the diameter of axial bore 56 is no more than about one-half the outside diameter of first cylindrical portion 52. As a result, insert 50 resembles a plug much more than a sleeve. The ends 58, 60 of the insert are preferably flat surfaces perpendicular to the axis of the insert.

As best seen in FIG. 1, the second cylindrical portion 54 has a height which is larger than the depth of counter bore 49. As a result, some of the second cylindrical portion 54 extends into the interior of differential case 12 when the insert 50 is press fit into bore 46 from the inside. When installed in this manner, the second cylindrical portion 54 effectively spaces one of the pair of pinion mates 42 away from the internal wall of the case 12. In the most preferred embodiments, the outside diameter of the second cylindrical portion 54 is at least as large as the diameter of the pinion mate 42 as measured at the larger end thereof. As further seen in FIG. 1, the preferred pinion mate 42 of the present invention differential case would have a flat outer surface, rather than a spherical outer surface. In this manner, any thrust force in either of the pinion mates 42 which is directed outwardly along the axis of cross shaft 44 will be borne directly by the insert 50, and particularly end 60, rather than by the case 12. However, in the event that a pinion mate having a spherical outer surface is used, is is within the scope of the invention to provide an insert with end 60 spherically machined to complement the outer surface of the pinion mate.

In a similar fashion, the loose fit of cross shaft 44 in the inserts 50 at the opposing ends of the cross shaft results in any radial thrust forces in the cross shaft being borne directly by the interior surface of axial bore 56 and not by the case 12. These radial thrust forces would be generated in the rotation of the differential case 12.

Since the use of a removable insert 50 in the case bore 46 permits the replacement of this critical area without replacement of the entire case 12, the hardness of the insert 50 relative to the hardness of the case is not particular relevant in the broadest sense. However, since there is no particular incentive to make the insert 50 a sacrificial element of the design, it is preferred in most known applications to provide an insert with a hardness exceeding the hardness of the case 12. It is known that the use of the insert 50 should allow a less expensive material to be used in the differential case 12. With the case 12 being so much more massive than the inserts 50, this could result in considerable cost savings.

The actual manufacture of the insert 50 will be a matter of design choice, given the important parameters of the insert as set out above. However, certain techniques, such as net forming the insert 50 from powdered metal or using another technique which would not require any machining would be preferred. Although not critical to the operation of the insert 50, an advantage of having a certain amount of porosity in the insert is that the insert is better able to lubricate surfaces against which it bears, such as the bevel drive gears and the cross shaft. In some embodiments anticipated by the inventor, it may be desirable to incorporate spiral grooves, slots, or the like on certain surfaces of the insert 50 where lubricant availability is considered more critical. Such surfaces may include the end face 60 which bears against the outer end of the bevel drive gear and interior surface of the axial bore 56.

It will be noted in FIG. 1 that at least one of the inserts 50 will need to be provided with a transverse bore 62 to accommodate the insertion of the screw 48 which retains the cross shaft 44 in the case 12. Although it is possible to form this bore 62 in the insert 50 prior to press fitting the insert in the case 12, the preferred method would be to create this bore after placement of the insert in the case, so that the bore 62 is precisely aligned with a bore 64 in the case in which the screw 48 is received. Bore 64 is, of course, transverse to bore 46 in which the insert 50 is to be seated. FIG. 1 shows the bore 64 being used at only one end of the pinion shaft 44, which also must be provided with a transverse bore 66, through which the screw will pass. However, it will also be understood that the same system of securing the pinion shaft 44 at each end can be used, if desired.

While the preferred embodiment teaches an insert with the larger diameter cylindrical portion 54 on the inside of the case 12 and seated in a counter bore 49 made from the inside of the case, it would be possible in some embodiments to reverse the insert shape so that it would be press-fitted into the differential case from the outside. However, if the same type of seating in a counter bore from the side as the press fit is used, this reversal would require a larger insert, if the end of the first or smaller cylindrical portion of the insert would be expected to be at least as large as the outer diameter of the pinion mate.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. An improved differential for a vehicle, the differential having a pair of shafts extending along an axis with one of a pair of opposed side gears splined to an inner end of each of the shafts, a differential case rotatable upon the shafts and enclosing the opposed side gears, a pinion shaft having its ends fitted into a pair of opposing bores in the differential case, and a pair of pinion mates mounted on the pinion shaft and in mesh with the pair of opposed side gears, wherein the improvement comprises:

an insert positioned in an interposing fashion between one of the ends of the pinion shaft and the one of the opposing bores in which the pinion shaft end is fitted such that at least one end of the pinion shaft, the insert and the bore in the differential case are each provided with a transverse bore, the respective transverse bores being alignable to receive a fastener to retain the pinion shaft in the differential case.

2. The improved differential of claim 1 wherein the insert is retained in the opposing bore by an interference fit.

3. The improved differential of claim 1 wherein the insert has a wear resistance greater than the wear resistance of the case.

4. The improved differential of claim 1 wherein the insert is formed from a powdered metal.

5. The improved differential of claim 1 wherein the fastener is a screw.

6. The improved differential of claim 1 wherein the insert comprises a cylindrical member with a first cylindrical portion thereof having an external diameter slightly greater than the internal diameter of the opposing bore and the cylindrical member has an axial internal bore therethrough.

7. The improved differential of claim 6 wherein the axial internal bore has an internal diameter greater than the external diameter of the pinion shaft end.

8. The improved differential of claim 6 wherein the opposing bore into which the insert is fitted has a counter bore of a larger diameter and a depth less than a thickness of the case and the cylindrical member further comprises a second cylindrical portion coaxial with the first cylindrical portion and having an external diameter slightly greater than the internal diameter of the counter bore.

9. The improved differential of claim 8 wherein the second cylindrical portion has a height greater than the depth of the counter bore.

10. The improved differential of claim 9 wherein the second cylindrical portion has a flat end.

11. The improved differential of claim 10 wherein the counter bore is made from the inside of the differential case.

12. The improved differential of claim 11 wherein the external diameter of the second cylindrical portion is at least as large as the diameter of the larger end of the pinion mate against which it bears.

13. An improved differential for a vehicle, the differential having a pair of shafts extending along an axis with one of a pair of opposed side gears splined to an inner end of each of the shafts, a differential case rotatable upon the shafts and enclosing the opposed side gears, a pinion shaft having its ends fitted into a pair of opposing bores in the differential case, and a pair of pinion mates mounted on the pinion shaft and in mesh with the pair of opposed side gears, wherein the improvement comprises:

an insert positioned in an interposing fashion between one of the ends of the pinion shaft and the one of the opposing bores in which the pinion shaft end is fitted, such that each of the pair of pinion mates moves axially along the pinion shaft independently of the other pinion mate and an outward thrust of either of the pair of pinion mates is borne directly on the insert.

* * * * *